INVENTORS
DONALD MOORE BARTON
ANTHONY GEORGE SMITH
By Cushman, Darby & Cushman
ATTORNEYS INVENTORS
DONALD MOORE BARTON
ANTHONY GEORGE SMITH
BY
Cushman, Darby & Cushman
ATTORNEYS INVENTORS
DONALD MOORE BARTON
ANTHONY GEORGE SMITH
By Cushman, Darby & Cushman
ATTORNEYS United States Patent Office 3,499,294

Patented Mar. 10, 1970

3,499,294

TEMPERATURE REFERENCE APPARATUS

Donald Moore Barton, Maidenhead, and Anthony George Smith, Hayes, England, assignors to De La Rue Frigistor Limited, London, England, a British company Filed Mar. 7, 1968, Ser. No. 711,432

Claims priority, application Great Britain, Mar. 13, 1967, 11,774/67

Int. Cl. F25b *21/02*

U.S. Cl. 62—3 10 Claims

ABSTRACT OF THE DISCLOSURE

A temperature reference apparatus including a chamber containing a fluid which undergoes a change of volume or pressure consequent upon a gain or a loss of heat, thermoelectric heat transfer means positioned to transfer heat to or from the chamber and a switch arrangement coupled for operation in accordance with a change of pressure or volume of the fluid, the switch arrangement including a first switch device connected to control the operation of the thermoelectric heat transfer means and a second switch device connected to control the operation of an alarm signal so that an indication may be obtained when the volume or pressure is below a minimum and above a maximum.

Figure 1:
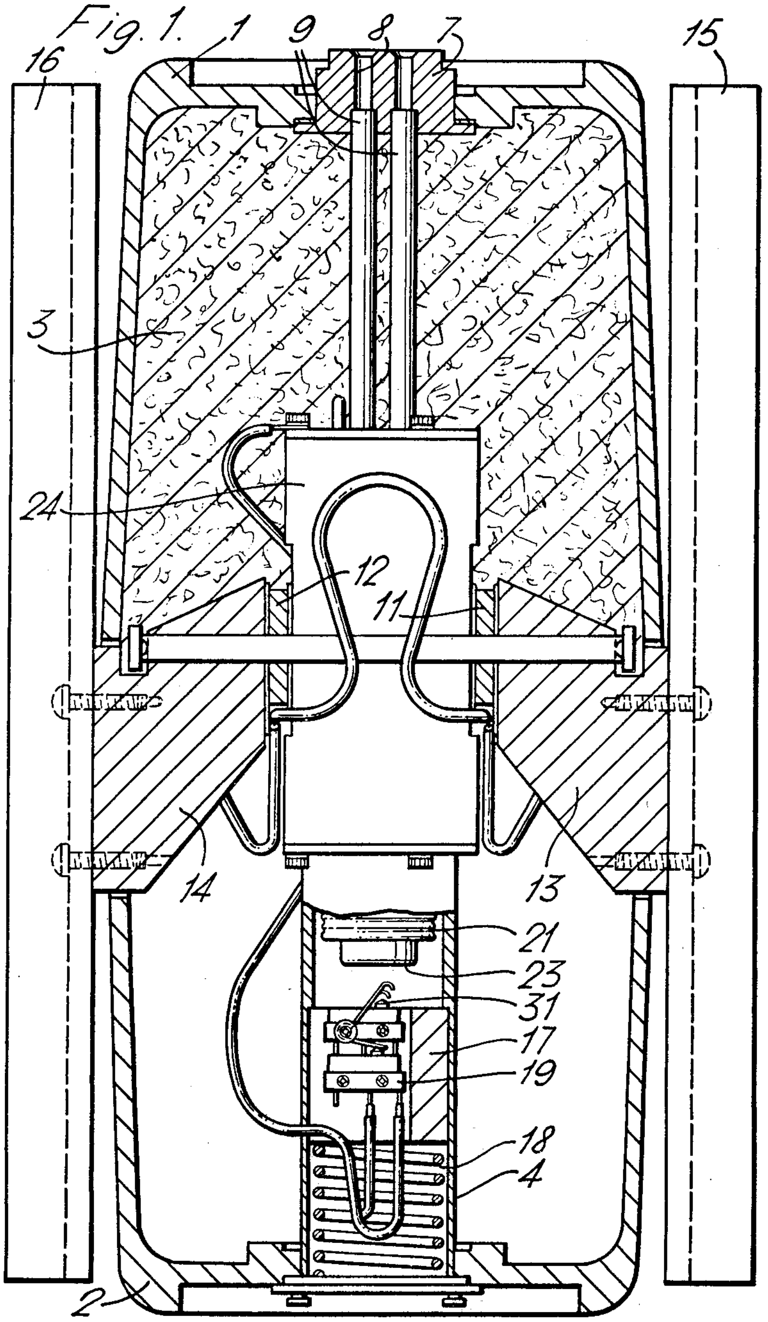

This invention relates to temperature reference apparatus of the type that depends on a thermally induced change of state of a working fluid in a chamber, with the consequent change of volume and/or pressure being detected by a device which controls the input of heat to or removal of heat from the working fluid. Such chambers are suitable for use as isothermal chambers for the reference junctions of thermocouples. Heat input and removal to and from such chambers are conveniently accomplished thermoelectrically, the electric current supply to the thermoelectric heat pump device being controlled by the volume- (or pressure-) detecting device. The volume and pressure detecting device is conveniently a bellows co-operating with a microswitch, the microswitch controlling the electric current supply to the thermoelectric device.

For accurate temperature measurement by the use of thermocouples the reference temperature must be accurately maintained and suitable apparatus for obtaining this desired condition comprises essentially a heat insulated thermoelectrically cooled chamber which is adapted to receive thermocouple junctions and to contain as the working substance a liquid which freezes at a convenient reference temperature. Water is commonly employed but other liquids, for example glycerol and benzene, having different freezing temperatures may equally be used.

In the case where water is the medium used the required reference temperature of 0° C. will be maintained all the time that there is ice and water close to the reference junction, the temperature being controlled by the water which melts and freezes during the cycle of heating/cooling operations at a substantially constant temperature. Thus the cooling power of the thermoelectric device must be sufficient to cool the chamber and the water to such an extent that the water will undergo a change of state and effect the desired cooling while heat is introduced through leads of the thermocouples the temperatures of whose reference junctions are required simultaneously to be maintained at a constant value.

In order to achieve the desired results the current supplied to the thermoelectric cooling devices is arranged to be in circuit with a switch which is operable in accordance with the expansion which takes place within the chamber upon the formation of ice. The apparatus is arranged to actuate the switch and to stop the cooling when a pre-determined amunt of ice has been produced. Conveniently the level is set at between 12% and 50% of ice, preferably between 18% and 32% and more especially at 25%.

The limits are chosen in order to maintain a large ice-water interface close to the reference junctions or their housings without the ice touching either the reference junctions or their housings in the neighborhood of the reference junctions.

When the reference apparatus is used as a reference chamber for thermocouple junctions the thermocouple reference junctions may be inserted in a tube whose closed end lies deep in the interior of the thermostatically controlled chamber and whose opposite end gives access from the outside to facilitate the insertion and removal of the reference junctions.

According to the present invention there is provided a temperature reference apparatus including a chamber containing a fluid which undergoes a change of volume or pressure consequent upon a gain or a loss of heat, thermoelectric heat transfer means positioned to transfer heat to or from the chamber, and a switch arrangement coupled for operation in accordance with a change of pressure or volume of the fluid, the switch arrangement including a first switch device connected to control the operation of the thermoelectric heat transfer means and a second switch device connected to control the operation of an alarm signal so that an indication may be obtained when the volume or pressure is below a minimum and above a maximum.

Figure 2:
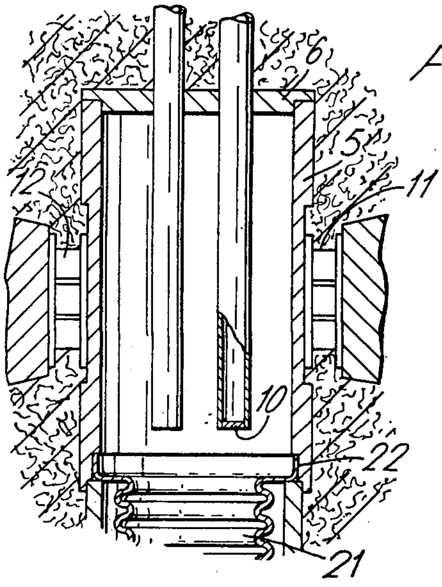
Figure 3:
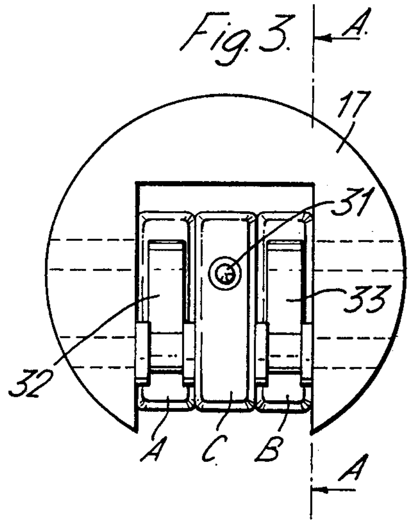
Figure 4:
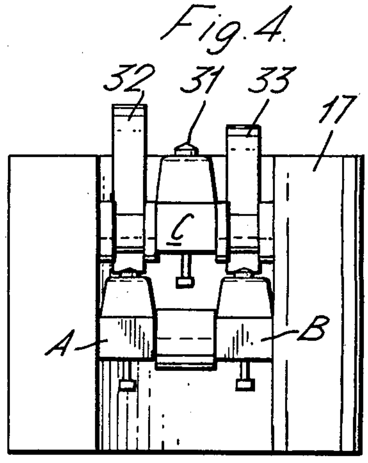
Figure 5:
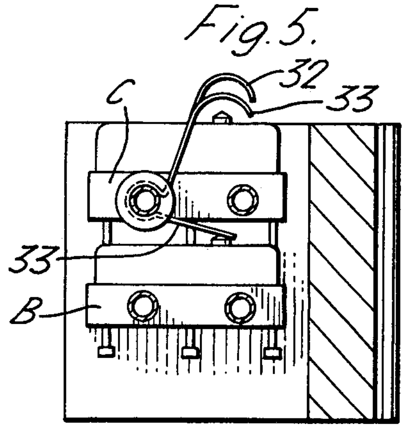
Figures 6A, 6B:
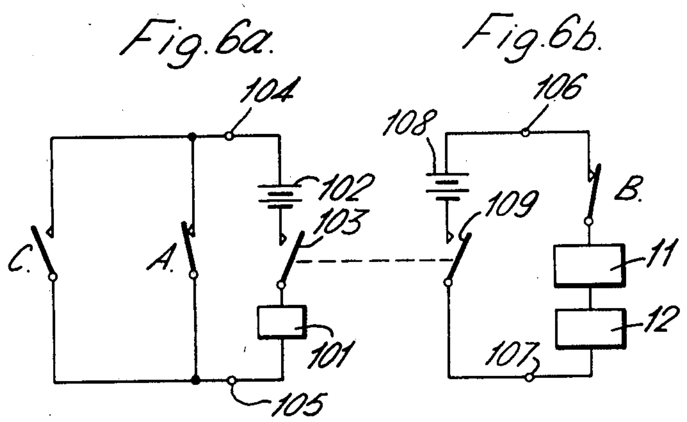

Embodiments of the invention will now be described with reference to the accompanying drawings which show in:

FIGURE 1 a diagrammatic longitudinal cross-section of a temperature reference apparatus, FIGURE 2 a longitudinal section through a part of the apparatus shown in FIGURE 1, FIGURE 3 a plan view of a switch arrangement used in the embodiment of FIGURE 1, FIGURE 4 a front elevation of the arrangement shown in FIGURE 3, FIGURE 5 a vertical section on the line A—A of FIGURE 3, and FIGURES 6*a*, 6*b*, 7 and 8 circuit arrangements for use with the apparatus of FIGURE 1.

Referring to FIGURES 1 and 2 there is shown an apparatus comprising a two-part casing 1 and 2 which is partly filled with a heat-insulating material 3. On the bottom of the casing there is provided a support frame 4 for a copper chamber 24 having side walls 5 and a cover 6 which may be seen from the section shown in FIGURE 2. The top part 1 of the casing is provided with an insert member 7 including a plurality of drilled holes 8. The cover 6 of the chamber 24 is provided with holes in vertical register with the holes 8 in the top of the casing, both sets of holes being adapted to accommodate stainless steel tubes two of which are shown at 9; the tubes 9 are provided with copper tips one of which is indicated at 10 in FIGURE 2. The tips 10 may be connected together mechanically with a good heat conducting material. The tubes 9 are designed to receive thermocouple leads and junctions (not shown), which junctions are inserted in the tubes so that they are situated as closely as possible to the tips of the tubes.

The side walls 5 of the chamber are in thermal contact with, but electrically insulated from, the cold junctions of thermoelectric heat transfer units 11 and 12 which in the particular embodiment are connected to cool the walls and contents of the chamber. The hot junctions of the thermoelectric devices are in good thermal contact, but electrically insulated from heat transfer blocks 13 and 14. To the heat transfer blocks 13 and 14 there are attached thermally conducting heat exchangers in the form of finned plates 15 and 16.

Within the support frame 4 and bearing against the inner walls of the frame is a platform 17 which is cut out to provide a slot and biassed upwardly by means of a coil spring indicated at 18. A switch arrangement consisting of a microswitch unit 19 is accommodated in the slot in the platform 17.

A bellows unit 21 which is closed at its lower end is in open communication with the interior of the chamber and is attached to the side walls of the chamber as indicated at 22. The closed end 23 of the bellows is made thick enough to operate the microswitch unit 19 which has three pairs of contacts operable according to the position of the end 23 of the bellows.

Referring to FIGURES 3 to 5 the switch arrangement can be seen to consist of the three separate microswitch devices A, B, and C arranged within the slot in the platform 17. The device A is operated via a spring lever 32, the device B via a lever 33, and the device C via a plunger 31.

In operation the whole of the chamber 24 and the interior of the bellows 21 is filled with water or some other suitable working medium. For convenience the following description assumes that water is used. Cooling is effected by means of the thermoelectric cooling units 11 and 12 until a predetermined amount of ice is produced in the chamber. The bellows device extends during the ice formation causing the end 23 to operate in turn the switch devices A, B, and C.

Referring to FIGURES *6a* and *6b* there are shown circuits including the contacts of the switch devices A, B and C in their unoperated positions i.e. in the positions they assume when the bellows is in its retracted condition. In FIGURE *6a* there is shown a series circuit including an alarm device 101, a power supply 102 and a switch 103 connected across a pair of terminals 104 and 105. These terminals are provided on the temperature reference apparatus and the series circuit is external to the apparatus. Connected across the terminals 104 and 105 and forming a part of the microswitch unit 19, as has already been explained, are the switch contacts A and C. In FIGURE *6b* there is shown a circuit including the thermoelectric heat transfer units 11 and 12 and the switch contact B connected across a pair of terminals 106 and 107. The terminals are provided on the reference apparatus and the circuit including the heat transfer units forms a part of the reference apparatus. External to the device and connected across the terminals 106 and 107 there is a power supply 108 and a switch 109 which is coupled mechanically to the switch 103. The power supplies 102 and 108 are independent.

In order to bring the apparatus into operation the switches 103 and 109 are operated so that the contacts are closed and, with the bellows of the device in the retracted position so that the contacts A, B and C are in the positions shown, power is connected via the heat transfer units 11 and 12 in such a direction as to cause the units to cool the water in the chamber 24. At the same time the switch 103 connects power from the supply 102 via the switch contacts A, which are closed when the bellows 23 is retracted due to its being above a given temperature, and the alarm 101 is thereby operated. As the water in the chamber 24 becomes sufficiently cooled it expands and ice begins to form resulting in the movement of the end 23 of the bellows towards the platform 17. The end 23 of the bellows operates the switch contacts A via the lever 32, and the contacts are thus caused to open. This results in the alarm circuit being broken and the signal from the alarm 101 is removed. However, the cooling effect produced by the units 11 and 12 continues until the expansion of the bellows is such that the contacts B are operated via the lever 33 and the supply of current to the units 11 and 12 is disconnected by the opening of the contacts B. Upon the removal of the cooling effect of the units 11 and 12 the temperature of the chamber 24 rises towards ambient temperature and the melting of ice which occurs allows the bellows to retract. At a given point in this movement of the bellows away from the platform 17 the contacts B are allowed to close again and the thermoelectric units are energized so that cooling of the chamber occurs again. This cycling operation will continue indefinitely until the switch 109 is opened. However, should a fault condition occur and the units 11 and 12 continue to cool the chamber so that the bellows expand past the point at which the switch contacts B should have been opened the switch contacts C are operated by the bellows end 23. When this extreme position is reached the contacts C are closed thereby operating the alarm 101 and drawing attention to the fact that a fault condition exists. Thus a device is provided with an arrangement which provides an alarm when there is excessive warming of the chamber 24 and an alarm when there is excessive cooling of the chamber 24. In normal operation the device cycles with the fraction of the working liquid in the chamber 24 in the frozen state varying between 24.6% and 25.4%. During this time no alarm or indicating signal is given by the device 101.

Figure 7:
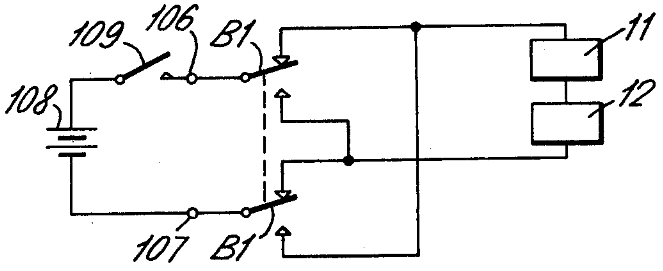

Referring to FIGURE 7 there is shown a modification of the arrangement shown in FIGURE *6b* in which, in place of the switch B, there is provided a switch B1 which is a reversing switch connected so that the power from the supply 108 may be connected through the heat transfer units 11 and 12 in either direction, thereby causing the units 11 and 12 either to cool or to warm the chamber 24 according to the direction of the current. Thus in the initial position of the switch B1 the current is passed through the units 11 and 12 so that the chamber 24 is cooled and when the position of the bellows has been reached at which it is determined that further cooling of the chamber is not required the switch B changes over causing a reversal of the current in the heat transfer units and the chamber 24 to be warmed by the thermoelectric heat transfer units 11 and 12. When the chamber 24 has been warmed to the predetermined limit and before the switch A is closed the switch B1 changes over and causes the chamber 24 to be cooled again. Thus cycling of the arrangement with controlled heating and cooling periods is provided.

Figure 8:
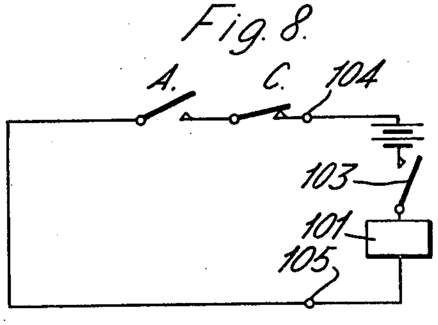

Referring to FIGURE 8 there is shown a modification of the arrangement shown in FIGURE *6a* in which the switch contacts A and C are connected in series. In this arrangement the contacts A are open when the bellows 23 is in the fully retracted position and the contacts C are closed. The contacts A are closed in the normal manner as the bellows expand. In this arrangement the alarm 101 will only be connected to the power supply during the cycling of the chamber while the heat transfer is such that the volume or pressure within the chamber is within the predetermined minimum and maximum. The alarm device 101 may in this instance conveniently be a lamp which is illuminated during the normal cycling operation of the device and which is extinguished when the apparatus is not operating normally either when it is initially switched on due to contacts A being opened or due to a fault condition when the contacts C are opened. The failure of the power supply 102 would cause the lamp to be extinguished and the fault condition to be indicated in the arrangement in FIGURE 8. Thus in this case the alarm is the absence of the illumination of the lamp.

Conveniently the switches are set so that A is closed when the proportion of water frozen is about 15%, B is closed when the proportion reaches 25% and C is closed when the proportion reaches 35%.

The spring 18 is preferably arranged so that when the bellows end 23 is moved sufficiently to actuate the switch there is no compression of the spring 18. However, under certain conditions it is possible for more than the predetermined quantity of ice to be formed or even for all the liquid to freeze. In such circumstances provided the bellows is designed to take the maximum possible expansion it will extend without, however, suffering any damage; one such position of the platform and microswitch is indicated by the dotted lines 25 in the drawing. The space below the platform 17 is large enough to accommodate the bellows in its fully extended state and as extension commences the platform will overcome the action of the spring 18 and descend. Because the pressure exerted by the bellows end 23 is taken up, against the action of the spring 18, by the top of the plate 17, no damage will be done to the microswitch unit upon the production of an excess amount of ice. The switch devices A, B and C need not be microswitches, any suitable switch may be used, for example, a switch employing an interrupted beam of light may be used.

We claim:

1. A temperature reference apparatus including a chamber containing a fluid which undergoes a change of volume or pressure consequent upon a gain or a loss of heat, thermoelectric heat transfer means positioned to transfer heat to or from the chamber and a switch arrangement coupled for operation in accordance with a change of pressure or volume of the fluid, the switch arrangement including a first switch device connected to control the operation of the thermoelectric heat transfer means and a second switch device connected to control the operation of an alarm signal so that an indication may be obtained when the volume or pressure is below a minimum and above a maximum.

2. An apparatus as claimed in claim 1 having a reversing switch in the first switch device.

3. An apparatus as claimed in claim 1 in which the working fluid is liquid at normal room temperatures.

4. An apparatus as claimed in claim 1 in which the change in volume or pressure consequent upon the gain or loss of heat is associated with a change of state of the fluid material within the chamber.

5. An apparatus as claimed in claim 3 in which the fluid is water.

6. An apparatus as claimed in claim 1 having a bellows, the interior of which is in communication with the interior of the chamber, the change of volume or pressure being communicated to the switch arrangement via the bellows.

7. An apparatus as claimed in claim 6, in which the bellows are capable of expanding to accommodate the complete freezing of the fluid without damage to itself, the chamber wall or the switch.

8. An apparatus as claimed in claim 1 in which the switch arrangement is mounted on a spring loaded platform.

9. An apparatus as claimed in claim 1, having a pair of switches in the second switch device, one of said pair being effective to cause the alarm signal to be operative when the volume or pressure exceeds the minimum and the other being effective to cause the alarm signal to be operative when the volume or pressure exceeds the maximum.

10. Apparatus as claimed in claim 9, further comprising a bellows member responsive to the change of volume or pressure effective to influence, sequentially, one of the switches in the second switch device, said first switch device and the other switch in the second switch device.

References Cited

UNITED STATES PATENTS

| | | | |
|---|---|---|---|
| 2,922,284 | 1/1960 | Danielson | 62—3 |
| 2,986,890 | 6/1961 | Bevans | 62—3 |
| 3,027,725 | 4/1962 | Harvey | 62—3 |
| 3,091,940 | 6/1963 | Feldman | 62—3 |
| 3,192,727 | 6/1965 | Ashby | 62—3 |

WILLIAM J. WYE, Primary Examiner